May 12, 1925.
K. ROTTGARDT
ELECTRIC REEL
Filed Aug. 26, 1921
1,537,702
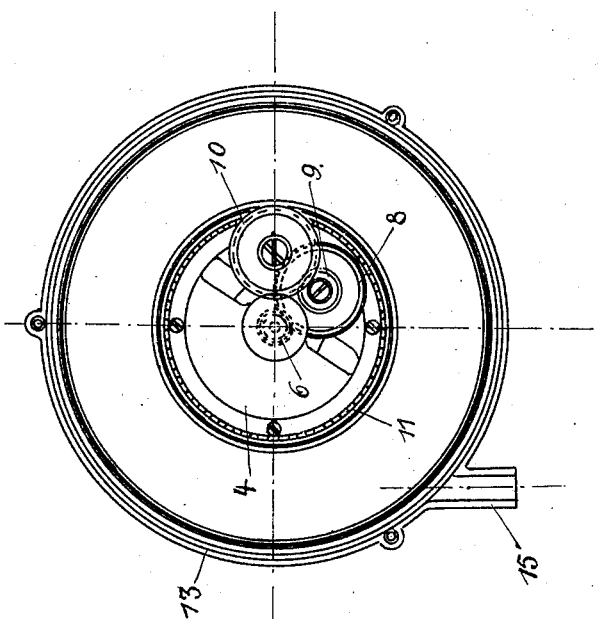
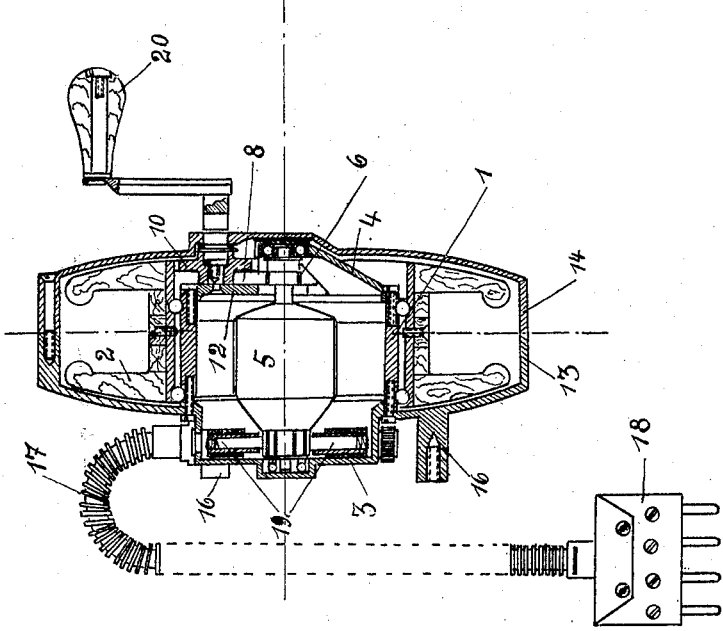
INVENTOR
Karl Rottgardt
BY Pennie, Davis, Marvin & Edmonds
ATTORNEYS Patented May 12, 1925.

1,537,702

UNITED STATES PATENT OFFICE.

KARL ROTTGARDT, OF DAHLEM, NEAR BERLIN, GERMANY, ASSIGNOR TO WESTINGHOUSE ELECTRIC & MANUFACTURING COMPANY, A CORPORATION OF PENNSYLVANIA.

ELECTRIC REEL.

Application filed August 26, 1921. Serial No. 495,598.

(GRANTED UNDER THE PROVISIONS OF THE ACT OF MARCH 3, 1921, 41 STAT. L., 1313.)

*To all whom it may concern:*

Be it known that I, Dr. KARL ROTTGARDT, residing at Dahlem, near Berlin, Germany, Fontanestr. 14, have invented certain new and useful Improvements in and Relating to Electric Reels; and I do hereby declare the following to be a full, clear, and exact description of the invention, such as will enable others skilled in the art to which it appertains to make and use the same.

My invention relates to an automatic reel or drum for winding cables and the like, more particularly for winding and unwinding the aerial conductor of wireless telegraphy stations. The object of the invention, in particular, is to construct a reel of this kind in combination with electrical driving means in such a manner that, on the one hand a very compact and complete combination results, and on the other hand the weight of the apparatus proves to be relatively small and the operation simple.

According to my invention an automatic reel with electrical driving means is so constructed that the electric motor together with the intermediate gearing is enclosed in the reel. The advantage thereby results, that the motor together with the driving gear lies protected in the interior of the reel and the whole apparatus appears similar to a reel without such driving means. Further the motor can be used also as the inner part of the drum of the reel, when the reel is built up through the medium of ball bearings on the outer casing of the motor. The front walls of the motor if correspondingly enlarged can serve as the boundary walls of the reel. The necessary transmission between the reel and the motor can be effected by means of a toothed wheel situated on the motor shaft with which internal teeth on the reel are in engagement. Of course friction wheels, belts or other usual forms of drive may also be employed. It is advantageous also so to construct the apparatus that after removal of one of the two front walls the motor and the reel with its gearing lies open and is easily accessible.

In one constructional embodiment there is provided a double-walled support which consists as it were of an outer casing and also an inner casing and between these two casings the transmission gear, for example toothed wheels, is inserted. The motor armature and the toothed wheels are fitted together outside the actual reel and these parts are then inserted as a whole into the reel. For the sake of security in case the motor fails or in order to be able to wind or unwind particularly slowly a hand-crank is suitably provided, which can be fixed on one of the intermediate toothed wheels and is only brought into action by the disconnection of a free-wheel device, but is usually not used. The whole reel can suitably be completely encased, openings for the wire to pass out, which are in some cases fitted with rollers to minimize the friction, being provided. Also traps or other movable parts can be provided in the covering in order to make it possible to inspect the interior of the reel when working. For the purpose of economizing space the arrangement can be such that the bearings of the motor, which are of smaller diameter than the body of the motor, are used as bearing surfaces for the reel or are also constructed as ball bearings.

One modification of the invention is illustrated by way of example in the accompanying drawing in which—

Fig. 1 shows a cross-section and

Fig. 2 a front view of the reel and driving mechanism after the cover of the casing has been removed.

Referring to the drawings, the motor casing 1 serves as a support for the drum 2 of the reel which can revolve round the casing 1 by means of the ball bearings. The armature 5 is journaled in ball bearings in the covers 3 and 4 of the motor casing 1. One end of the motor shaft is provided with a toothed wheel 6 which is connected with the internal tooth-work 11 of drum 2 of the reel through the intermediate transmission gears 8, 9, 10. The toothed wheels 8, 9 and 10 can be journaled in a plate 12 fixed to the casing 1 of the motor. The upper part of the cover 4 of the casing can be left open in order that the gearing 9, 10, 11 may be easily accessible. The reel together with the gearing is enclosed by a casing 13, 14 made in two parts, one part 13 of which is fixed to the motor casing 1 while the other part 14 is detachably fitted to the part 13 for the purpose of easily exposing the gear and the drum. The part 13 is further provided with a tubular opening 15 through which the aerial passes. By means of the projecting pieces 16 the whole apparatus can be connected to any frame-work or the like, for example, to the casing of a larger apparatus which is situated near by. The electric current conduction is effected by means of a flexible cable 17 which is connected to the plug-contacts 18. The brushes 19 for the electro-motor, which can be of bolt-like form, are pressed against the commutator by springs and are movably fitted in a sleeve. Finally there may also be provided a crank-handle 20 which can be inserted over a suitable plug which is fitted, for example, to the shaft of the toothed wheel 10 and permits the working of the reel in case the motor fails or if a very slow speed of revolution is necessary.

Having now particularly described and ascertained the nature of my said invention and in what manner the same is to be performed I declare that what I claim is:

1. A reeling device for wireless antenna and the like, comprising an electric motor, a reel revolubly mounted on said motor, a means interposed between said motor and said reel whereby said motor may drive said reel, and a separable casing enclosing said reel, motor and transmission means, a portion of said casing being removable to expose said reel and transmission means, and the other portion having lugs thereon for mounting.

2. A reeling device for wireless antenna and the like, comprising an electric motor having a stationary member and a rotating member, a pinion gear on the rotating member, a reel revolubly mounted on said stationary member having internal gear teeth near one edge, a gear mounted on the stationary member of said motor and meshing with said internal gear and said pinion gear to transmit motion from said rotating member to said reel, and means for releasably engaging said intermediate gear with a crank handle.

3. A reeling device for wireless antenna and the like, comprising an electric motor having a stationary member and a rotating member, a pinion gear mounted on the shaft of said rotating member, a reel revolubly mounted on the casing of said stationary member, said reel having an internal gear near one edge, an intermediate gear mounted on the casing of said stationary member and meshing with said internal gear and said pinion gear to transmit motion from said rotating member to said reel, means for attaching auxiliary driving means to said intermediate gear, a separable casing enclosing said reel, motor and gears having a cable outlet thereon, one portion of said casing being removable to expose said reel and gears, the other portion having lugs thereon for mounting.

4. A reeling device for wireless antenna and the like, comprising a motor having a cylindrical field casing and an armature journaled therein, a pinion gear mounted on the shaft of said armature, a reel revolubly mounted on the cylindrical surface of said field casing, an internal gear near the edge of said reel, an intermediate gear mounted on said field casing meshing with said internal gear and said pinion to transmit motion from said armature to said reel, means for attaching a crank-handle to said intermediate gear, a separable casing enclosing said reel, motor and transmission means, part of said casing being removable to expose said reel and transmission means and the other part having lugs thereon for mounting, and a flexible conduit attached to said casing to lead conductors to said motor.

In testimony whereof I affix my signature.

Dr. KARL ROTTGARDT.